United States Patent [19]
Colyn

[11] 3,749,976
[45] July 31, 1973

[54] SUPPLY SYSTEM HAVING SHORT-CIRCUIT VOLTAGE REGULATION

[75] Inventor: Roland Colyn, Perreux, France

[73] Assignee: Compagnie Generale d'Electricite, Paris, France

[22] Filed: Apr. 13, 1972

[21] Appl. No.: 243,650

[30] Foreign Application Priority Data
Apr. 13, 1971 France .............................. 7112956

[52] U.S. Cl. ............ 315/241 R, 315/206, 315/219, 315/243, 315/306, 323/24, 323/25, 328/67, 331/94.5 P
[51] Int. Cl. .............................................. H01s 3/09
[58] Field of Search ............... 323/8; 315/206, 207, 315/219, 240, 241 R, 243, 245, 276, 306, 307; 321/18; 323/8, 22 SC, 22 X, 24, 25; 328/67, 71, 75, 78; 331/94.5 P, 94.5 PE

[56] References Cited
UNITED STATES PATENTS

| | | | |
|---|---|---|---|
| 3,628,048 | 12/1971 | Lee et al. .......................... | 328/67 X |
| 3,440,519 | 4/1969 | Macemon ......................... | 323/24 X |
| 3,675,116 | 7/1972 | Israel .............................. | 323/22 SC |
| 3,432,725 | 3/1969 | Rotch ............................. | 315/206 X |

Primary Examiner—A. D. Pellinen
Attorney—Richard C. Sughrue, John H. Mion et al.

[57] ABSTRACT

A first thyristor switch is turned on to supply charging current to the storage member until it is charged to a high predetermined or regulated voltage. when this voltage is reached, the first switch is turned off, and a second thyristor switch, connected across the storage member, is turned on to short-circuit the supply system. A voltage-limiting circuit keeps the voltage across the second switch to a value well below the high regulated voltage of the storage member.

4 Claims, 3 Drawing Figures

SUPPLY SYSTEM HAVING SHORT-CIRCUIT VOLTAGE REGULATION

BACKGROUND OF THE INVENTION

1. Field of the Invention

The present invention relates to a supply system having short-circuit voltage regulation and, more particularly, to a system of this type which is adapted to charge an electric energy storage member and to recharge it when it has discharged at least partially into an external circuit.

2. Description of Prior Art

Supply systems delivering a regulated unidirectional voltage are known and are particularly intended to charge a member for the storage of the electric energy necessary for the operation of a laser generator. Under the action of a manual or automatic control device, this storage member, such as a capacitor, is partially discharged into an external circuit which generally consists of an electronic flash member, and the luminous energy supplied by the flash member excites an active material which delivers a laser pulse. The supply system then recharges the storage member which is then ready to trigger a further pulse. These supply systems generally comprise a transformer whose primary winding is connected to the alternating-current mains and whose secondary winding is connected through a rectifying device to the terminals of the storage member to be charged. A device controlled by the voltage across the terminals of the capacitor interrupts the supply to the transformer as soon as this voltage reaches a predetermined value. When the repetition rate of the pulses supplied by the laser is high, this interruption may be advantageously effected by means of a first electronic switch, for example of the kind comprising thyristors, which is interposed in the primary circuit of the transformer.

In such supply systems, it is found that the voltage regulation is inaccurate. In order to obviate this disadvantage, some supply systems, here referred to as supply systems having short-circuit voltage regulation, comprise in addition a second electronic switch which consists of a thyristor, for example, which is connected in parallel with the output terminals of the rectifying device, the thyristor being rendered conductive as soon as the voltage across the terminals of the capacitor reaches the predetermined value. A rectifier is then connected in series with the storage member in order to prevent it from discharging through the short-circuiting thyristor. However, although the precision of the supply system is then improved, its output is generally appreciably lowered, since the rectifying device connected to the secondary winding of the transformer generally comprises at least one capacitor whose energy is dissipated in the short-circuit each time the latter is established.

In order to avoid this dissipation of energy, some supply systems having short-circuit voltage regulation comprise another capacitor in series with the second switch. During the short-circuit produced with the aid of this second switch, the energy stored in the capacitor connected to the rectifying device is transferred into the other capacitor, the energy stored in this other capacitor thereafter being transferred to the storage member.

However, this latter supply system is not adapted to charge members for the storage of electric energy necessary for the operation of laser generators which deliver a considerable energy and in which the storage member must be charged to a high voltage, because the second switch consists of a thyristor, and thyristors which are capable of resisting this high voltage are very elaborate or even do not exist.

SUMMARY OF THE INVENTION

The present invention has for its object to provide a supply system having short-circuit voltage regulation which is not attended by the aforesaid disadvantages.

The present invention relates to a supply system having short-circuit voltage regulation and which is adapted to charge a member for the storage of electric energy and to recharge it after it has been discharged into an external circuit, the said system comprising: a unidirectional-voltage source comprising an internal impedance and a first switch in series, the voltage source maintaining between a first terminal and a second terminal a unidirectional electric potential difference which is higher than the regulated voltage, the first terminal having a first polarity and the second terminal a second polarity; a second switch and a first capacitor which are connected in series and are connected to the first and second terminals; a first rectifier connected between the first terminal and a third terminal, the first rectifier comprising, like the other asymmetrically conducting elements mentioned in the following, a first main electrode and a second main electrode such that these asymmetrically conducting elements are connected in the forward direction if the first electrode is connected to the first terminal having the first polarity, the first electrode of the first rectifier then being connected to the first terminal, and the storage member being connected between the said third and second terminals; and means for controlling the opening and closing of the first and second switches; the system being characterized by the fact that it comprises means for limiting the voltage across the terminals of the second switch to a value below the regulated voltage.

The present invention will be more readily understood from the following description, which is given with reference to the drawings attached by way of illustration and not by way of limitation.

DESCRIPTION OF THE PREFERRED EMBODIMENTS

Figure 1:
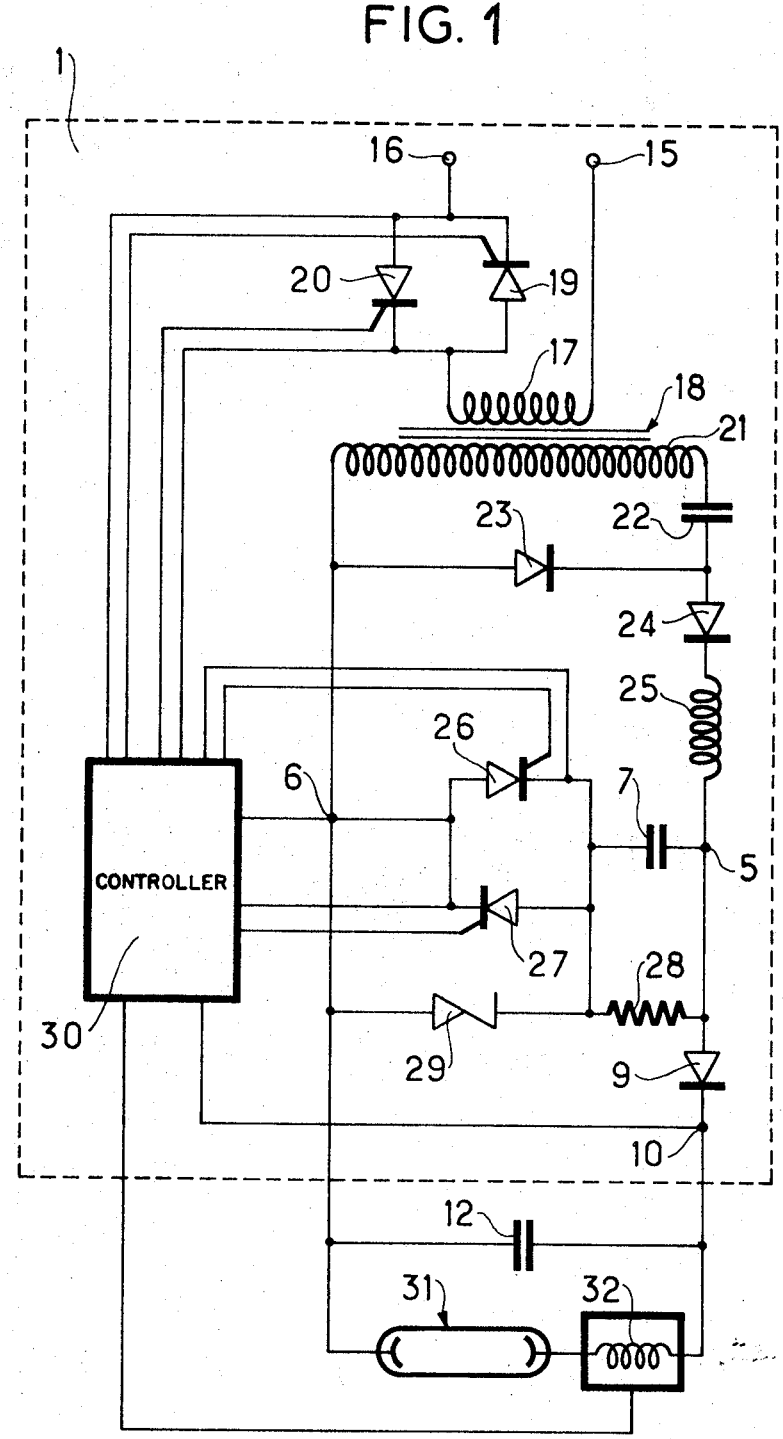
FIGS. 1, 2 and 3 are basic circuit diagrams of embodiments of the supply system according to the invention. In these figures, identical elements are denoted by like reference numerals.

FIG. 1 is a basic circuit diagram of one embodiment of the supply system according to the invention and shows a supply system 1 comprising two input terminals 15 and 16 connected to the inputs of the primary winding 17 of a transformer 18 through a switch consisting of two thyristors 19 and 20 which are connected in parallel and arranged in opposite senses. The secondary winding 21 of the transformer 18 is connected to a rectifier device known as a voltage doubler rectifier device. One terminal of a capacitor 22 is connected to one side of the secondary winding 21, while the other terminal of the capacitor 22 is connected to the cathode of a rectifier 23, the anode of which is connected to the other side of the secondary winding 21. The anode of a recitifier 24 is connected to the common link between the rectifier 23 and the capacitor 22, the cathode of the rectifier 24 being connected to one terminal of a non-capacitive impedance, which may be, for example, an inductance 25. The other terminal of the inductance 25 is connected to a terminal 5. In addition, the common link between the secondary winding 21 and the anode of the rectifier 23 is connected to a terminal 6.

Disposed between the terminals 5 and 6 is a circuit comprising in series a capacitor 7 and a switch consisting of two thyristors 26 and 27 which are connected in parallel and disposed in opposite senses. A resistor 28 is connected in parallel with the capacitor 7, and a Zener diode 29 is connected in parallel with the two thyristors 26 and 27, the anode of the Zener diode 29 being connected to the terminal 6. A rectifier 9 is disposed between the terminal 5 and a terminal 10.

The auxiliary electrodes and the cathodes of the thyristors 19, 20, 26 and 27 are connected to a controller device 30, by means of which it is possible to bring them from their conductive state to the non-conductive state and vice versa. The device 30 may comprise, for example, a reference voltage source whose value corresponds to the value of the desired regulation voltage, this source being connected to the input of a comparator-amplifier circuit whose outputs are connected to the auxiliary electrodes and to the cathodes of the thyristors to be controlled.

The description of the operation of the supply system illustrated in FIG. 1 will be divided into three parts.

First of all, the terminals 15 and 16 are connected to an alternating-voltage source, for example, the mains. The terminals 10 and 6 are connected to the storage member to be charged, which member consists of a capacitor 12 intended to be charged to a regulated voltage U. This capacitor 12 may be intended, for example, to be discharged thereafter by an electronic flash member 31 which then illuminates an active material (not shown) so as to obtain the laser effect. An inductance 32 may be disposed in the discharge circuit of the capacitor 12 to enable the discharge to be triggered. For this purpose, there is provided a triggering device (not shown) which is connected to the inductance 32 and to the device 30. The device 30 receives not only the information of the voltage between the terminals 10 and 6, but also receives information from a programming system (not shown in FIG. 1), by means of which it is possible to obtain a laser pulse sequence.

In a first operating phase, the thyristors 19, 20 and 26 are biased by means of the device 30. The thyristors 19 and 20 are conductive when there is a direct voltage between their main electrodes, but the thyristor 26 remains non-conductive on account of the inverse unidirectional voltage which is produced at the output terminals of the rectifying device. The capacitor 12 is charged through that rectifier 9 owing to the unidirectional voltage. The capacitor 22 and the inductance 25 are also charged. The current flowing in the branch 5–6, which current corresponds to the very weak current flowing through the thyristors 26 and 27 and to the current flowing in the branch 28–29, is substantially negligible. The voltage across the terminals of the thyristors 26 and 27 is limited by the potential difference at the terminals of the Zener diode 29, the current flowing through the Zener diode 29 being in turn limited by the resistor 28. The Zener diode 29 is obviously so chosen that this voltage is compatible with the characteristics of the two thyristors 26 and 27, which voltage may be distinctly lower than the regulated voltage U to which it is desired to charge the capacitor 12.

The second operating phase commences at the instant when the voltage between the terminals 10 and 6 reaches the value U. The device 30 then supplies the signals necessary for turning on the thyristor 27 and switching off the biasing of the thyristors 19, 20 and 26. At this instant, a short-circuit is set up between the terminals 5 and 6. The voltage drop across the terminals of the impedance consisting of the capacitor 22 and the inductance 25 suddenly increases, thereby causing a substantial reduction of the potential difference between the terminals 5 and 6. The inductance 25 limits the rate of variation of the current flowing through the thyristor 27. This results in an instantaneous interruption of the charging of the capacitor 12 which nevertheless retains the charge which it has acquired in the course of the first phase owing to the presence of the rectifier 9.

The short-circuit current flowing in the branch 5–6 is supplied on the one hand by the energy stored in the capacitor 22 and the inductance 25 and on the other hand by the supply energy of the primary winding 17 corresponding to the current which continues to flow until the end of the half-cycle of the supply voltage applied between the terminals 15 and 16. The short-circuit current which flows in the branch 5–6 charges the capacitor 7.

In the third operating phase, the capacitor 12 is discharged into the electronic flash device 31 owing to the triggering device in combination with the inductance 32.

After this discharge, the thyristors 19, 20, 26 and 27 are again biased as they were in the course of the first phase. The capacitor 7, charged in the course of the second phase, then discharges into the capacitor 12 through the thyristor 26, which is conductive, and the rectifier 9. The charging of the capacitor 12 is then resumed through the circuit 21 – 22 – 24 – 25 – 9.

It will thus be apparent that, in the system corresponding to the circuit diagram of FIG. 1, the voltage across the terminals of the thyristors 26 and 27 is limited owing to the presence of the Zener diode 29 and of the resistor 28, which is an important advantage.

Figure 2:
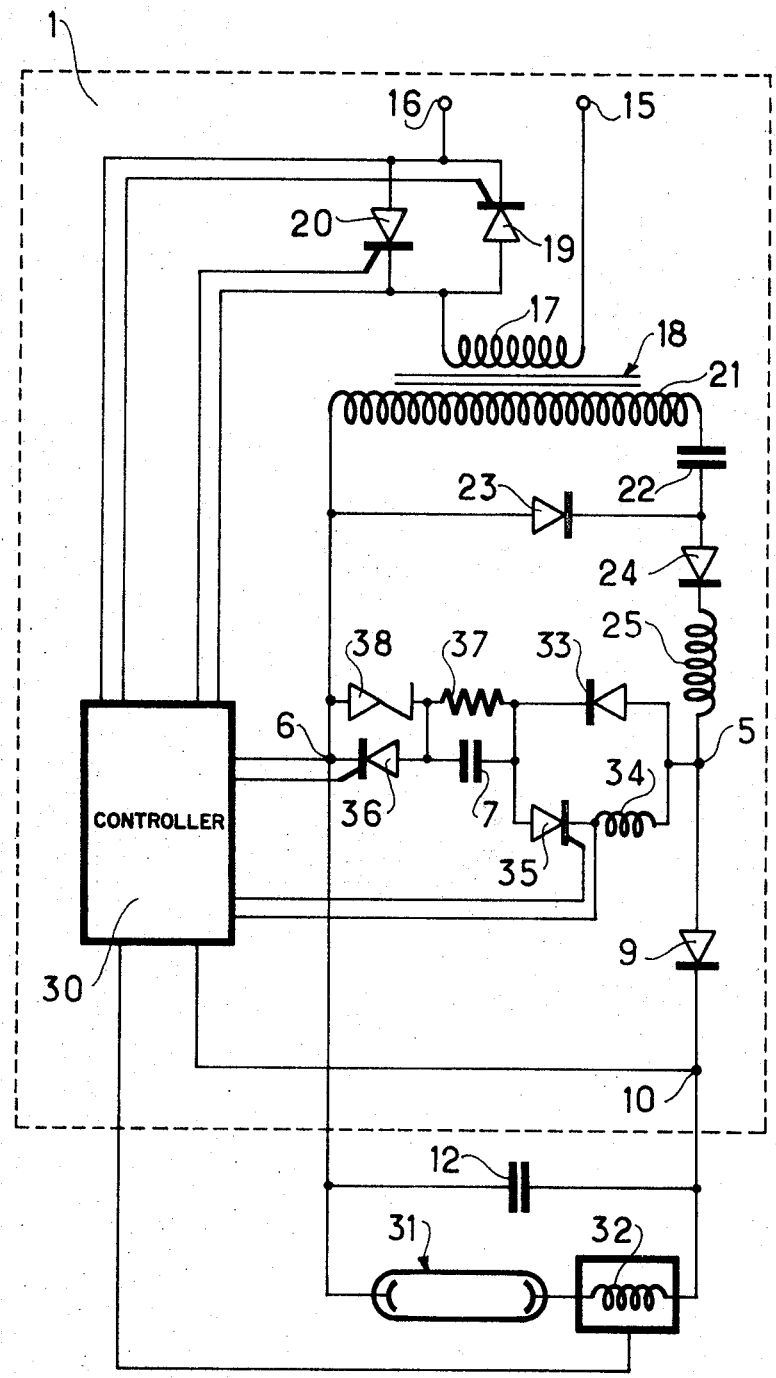

FIG. 2 is a basic circuit diagram of another embodiment of the supply system according to the invention. This circuit diagram differs from that illustrated in FIG. 1 only in the structure of the circuit present between the terminals 5 and 6.

In FIG. 2, the terminal 5 is connected on the one hand to the anode of a rectifier 33 and to one terminal of an inductance 34. The other terminal of the inductance 34 is connected to the cathode of a thyristor 35, the anode of the thyristor 33 being connected to the cathode of the rectifier 35 and to one terminal of a capacitor 7. The other terminal of the capacitor 7 is connected to the anode of a thyristor 36, the cathode of the thyristor 36 being connected to the terminal 6. A resistor 37 is arranged in parallel with the capacitor 7 and a Zener diode 38 in parallel with the thyristor 36, the anode of the Zener diode 38 being connected to the terminal 6. The auxiliary electrodes and the cathodes of the thyristors 35 and 36 are connected to device 30 by means of which it is possible to bring them from the conductive state to the non-conductive state and vice versa.

As in the case of FIG. 1, the description of the operation of the supply system illustrated in FIG. 2 may be divided into three parts.

In a first operating phase, the thyristors 19, 20 and 35 are biased by means of the device 30. The thyristors 19 and 20 are conductive when there is a direct voltage between their main electrodes, but the thyristor 35 remains non-conductive on account of the inverse unidirectional voltage which is produced at the output terminals of the rectifying device. The current flowing in the branch 5–6 is negligible. On the other hand, the capacitors 12, 22 and the inductance 25 become charged.

The second phase commences at the instant when the voltage between the terminals 10 and 6 reaches the value U. At this instant, the thyristor 36 is conductive and the thyristors 35, 19 and 20 are non-conductive. A short-circuit current charges the capacitor 7, the charging of the capacitor 12 being stopped.

In the third operating phase, the capacitor 12 is discharged into flash device 31, as in the case of the preceding figure.

The thyristors 19, 20, 35 and 36 are thereafter biased again as they were in the course of the first phase. The capacitor 7 is discharged into the capacitor 12 through the circuit composed of the thyristor 35, the inductance 34, the rectifier 9 and the Zener diode 38. By means of the inductance 34, the rate of variation of the current in the thyristor 35 can be limited. The charging of the capacitor 12 thereafter starts again through the circuit 21 – 22 – 24 – 25 – 9.

The operation of the system illustrated in FIG. 2 is therefore similar to that of the system illustrated in FIG. 1.

Figure 3:
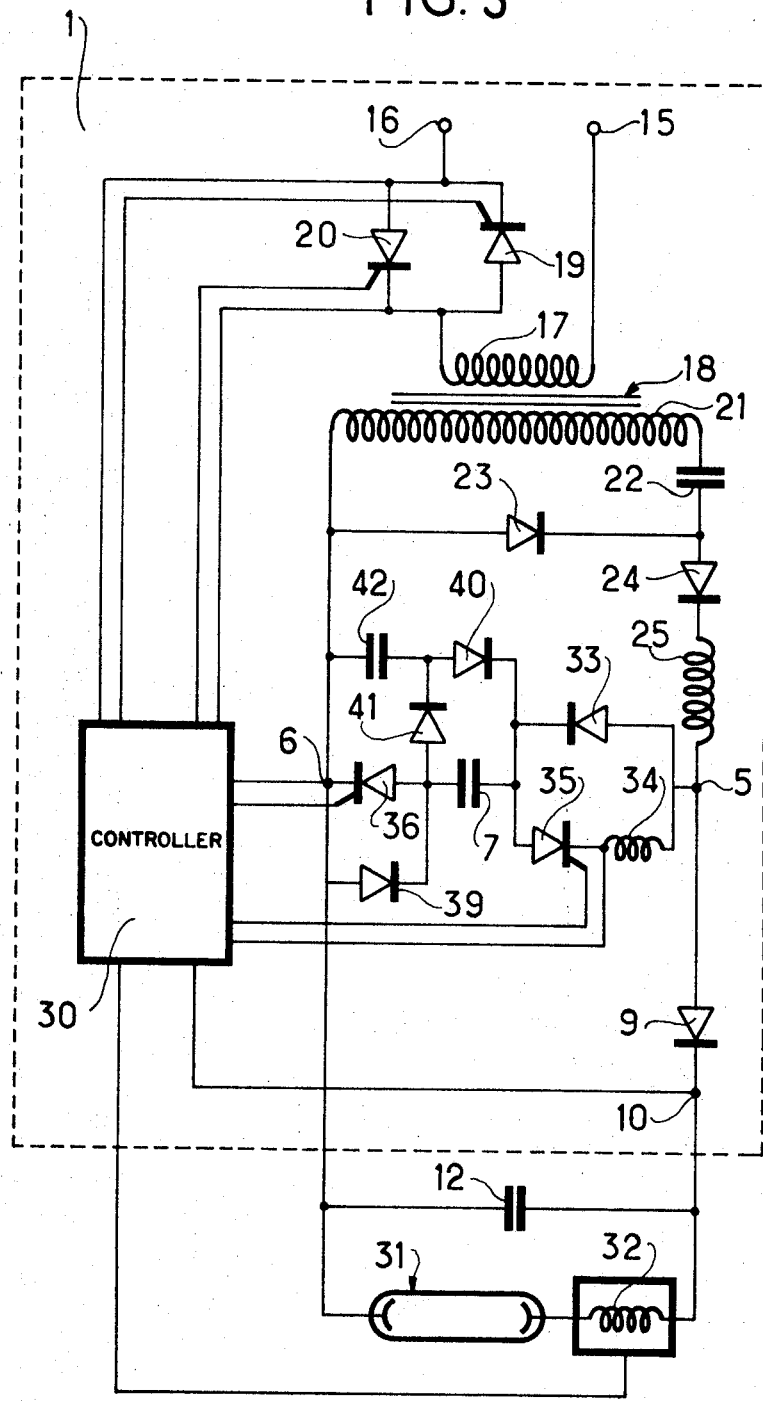

FIG. 3 illustrates another embodiment of the supply system according to the invention. This circuit diagram differs from that of FIG. 2 only by the fact that the voltage across the terminals of the thyristor 36 is limited owing to a capacitive divider circuit instead of by means of a Zener diode circuit.

In FIG. 3, the terminal 5 of the system 1 is connected on the one hand to the anode of a rectifier 33 and to one terminal of an inductance 34. The other terminal of the inductance 34 is connected to the cathode of a thyristor 35, the anode of which is connected to the cathode of the rectifier 33 and to one terminal of a capacitor 7. The other terminal of the capacitor 7 is connected to the anode of a thyristor 36, the cathode of which is connected to the terminal 6. A rectifier 39 is connected in parallel with the thyristor 36, its anode being connected to the terminal 6. The common link between the thyristor 35 and the rectifier 33 is connected to the cathode of a rectifier 40, the anode of which is connected to the cathode of a rectifier 41 and to one terminal of a capacitor 42, the anode of the rectifier 41 being connected to the common link between the capacitor 7 and the thyristor 36. The other terminal of the capacitor 42 is connected to the terminal 6.

The system illustrated in FIG. 3 operates as follows.

In a first operating phase, the thyristors 19, 20 and 35 are biased by means of the device 30. The capacitors 12, 22 and the inductance 25 become charged. In the circuit 5–6 the capacitors 7 and 42 become charged also through the rectifiers 33 and 41. The voltage across the terminals of the capacitors 7 and 42 is inversely proportional to their capacitances, and hence the thyristor 36 is subjected only to a fraction of the charging voltage U of the capacitor 12. The thyristor 35 performs no function in this first phase, because it undergoes between its main electrodes an inverse voltage which corresponds to the forward voltage drop of the rectifier 33.

The second operating phase commences at the instant when the voltage across the terminals of the capacitor 12 reaches the value U. The thyristors 19, 20 and 35 are non-conductive and the thyristor 36 is conductive, owing to the device 30. The voltage across the terminals of the thyristor 36 decreases substantially, and this results in an equivalent voltage drop between the terminals 5 and 6. The charges of the capacitor 22 and of the inductance 25 are partly transferred into the capacitor 7. The charging of the capacitor 12 immediately stops. The capacitor 42 retains the charge which it has acquired in the course of the preceding phase owing to the presence of the rectifier 41.

In the third operating phase, the capacitor 12 is discharged into the circuit 31–32 as in the case of the preceding figures, the capacitors 7 and 42 retaining their charge.

Finally, owing to the device 30, the thyristors 19, 20, 35 and 36 are biased again as they were in the course of the first phase. The capacitor 7 discharges into the capacitor 12 through the thyristor 35, the inductance 34, the rectifier 9 and the rectifier 39. Likewise, the capacitor 42 transmits its charge to the capacitor 12 through the rectifier 40, the thyristor 35, the inductance 34 and the rectifier 9. The inductance 34 limits the rate of variation of the current flowing through the thyristor 35.

It will be apparent from the description of the operation of the supply system illustrated in FIGS. 1, 2 and 3 that the voltage precision of this system is excellent and that its output is very high, because on the one hand the charging of the storage capacitor is stopped at the precise instant when the voltage between the terminals 10 and 6 reaches the value U. The value of the end-of-charge voltage of this capacitor cannot increase beyond the value U, since the supply of additional energy at the end of the half-cycle, which is brought about by the termination of the conduction of the thyristor 19 or 20, is passed to the circuit 5–6. On the other hand, the energy stored in the capacitor 22 and the inductance 25, as well as the residual conduction energy of the thyristors 19 and 20, is successively transferred into the capacitor 7 and in some cases into the capacitor 42, and then into the storage member to be charged at the beginning of the succeeding recharging cycle. There is therefore no loss of energy during the short-circuit operation. The energy losses occurring in the course of the operation of the system are very small. They consist, only in the cases of FIGS. 1 and 2 in which the circuit arrangement comprises a Zener diode, of the losses in the Zener diodes 29 or 38 and in their bias resistors 28 or 37. The losses corresponding to the inverse or forward conduction of the rectifiers and of the thyristors shown in the diagrams of FIGS. 1, 2 and 3 are negligible.

Moreover, the three embodiments of the supply system according to the invention, as described with reference to FIGS. 1, 2 and 3, comprise means for limiting the voltage across the terminals of the main electrodes of the thyristor by means of which the short-circuiting is effected, it being possible for the limit value of this voltage to be very much lower than the charge voltage of the electric energy storage member.

The supply system according to the invention therefore makes it possible to charge electric energy storage members at a high voltage, the thyristors of this supply system nevertheless being of relatively low cost.

While the invention has been particularly shown and described with reference to preferred embodiments thereof, it will be understood by those skilled in the art that various changes in form and details may be made therein without departing from the spirit and scope of the invention.

I claim:

1. An electrical power supply system having short-circuit voltage regulation and which is adapted to charge an electric energy storage member and to recharge it after it has been discharged into an external circuit, said system comprising:
   a. a unidirectional-voltage source comprising an internal impedance and a first switch in series, said voltage source maintaining between a first terminal and a second terminal a unidirectional electric potential difference which is higher than said regulated voltage, said first terminal having a first polarity and said second terminal a second polarity;
   b. a second switch and a first capacitor connected in series and connected to the said first and second terminals;
   c. first rectifier means connected between said first terminal and a third terminal and comprising an asymmetrically conducting element having a first main electrode and a second main electrode such that said asymmetrically conducting element is connected in the forward direction if said first electrode is connected to said first terminal having said first polarity, the first electrode of said first rectifier means being connected to said first terminal, and said storage member being connected between the said third and second terminals;
   d. means for controlling the opening and closing of the said first and second switches; and circuit means for limiting the voltage across the terminals of said second switch to a value below said regulated voltage;
   e. said second switch comprising a first thyristor having a first main electrode, a second main electrode and an auxiliary electrode, said second main electrode of said first thyristor being connected to said second terminal, said first main electrode of the said first thyristor being connected to one terminal of said first capacitor, and the other terminal of said first capacitor being connected to said first terminal; and
   f. said circuit means comprising a Zener diode whose first electrode is connected to said second terminal and whose second electrode is connected to the first electrode of said first thyristor; a resistor connected in parallel with the first capacitor; second rectifier means connected between the other terminal of said first capacitor and said first terminal, the second main electrode of said second rectifier means being connected to said other terminal of said first capacitor, and the first main electrode of said second rectifier means being connected to said first terminal; a second thyristor whose first main electrode is connected to said other terminal of said first capacitor and whose second main electrode is connected to said first terminal; and means connected to the auxiliary electrodes and the cathodes of said first and second thyristors for controlling the conduction of said thyristors.

2. An electrical power supply system having short-circuit voltage regulation and which is adapted to charge an electric energy storage member and to recharge it after it has been discharged into an external circuit, said system comprising:
   a. a unidirectional-voltage source comprising an internal impedance and a first switch in series, said voltage source maintaining between a first terminal and a second terminal a unidirectional electric potential difference which is higher than said regulated voltage, said first terminal having a first polarity and said second terminal a second polarity;
   b. a second switch and a first capacitor connected in series and connected to the said first and second terminals;
   c. first rectifier means connected between said first terminal and a third terminal and comprising an asymmetrically conducting element having a first main electrode and a second main electrode such that said asymmetrically conducting element is connected in the forward direction if said first electrode is connected to said first terminal having said first polarity, the first electrode of said first rectifier means being connected to said first terminal, and said storage member being connected between the said third and second terminals;
   d. means for controlling the opening and closing of the said first and second switches; and circuit means for limiting the voltage across the terminals of said second switch to a value below said regulated voltage;
   e. said second switch comprising a first thyristor having a first main electrode, a second main electrode and an auxiliary electrode, said second main electrode of said first thyristor being connected to said second terminal, said first main electrode of the said first thyristor being connected to one terminal of said first capacitor, and the other terminal of said first capacitor being connected to said first terminal; and
   f. said circuit means comprising a second capacitor; second, third, fourth and fifth rectifier means; a second thyristor; one of the terminals of said second capacitor being connected to said second terminal and the other terminal of said second capacitor being connected to the first electrode of said fourth rectifier means and to the second electrode of said fifth rectifier means, the first electrode of said fifth rectifier means being connected to the first main electrode of said first thyristor, the second electrode of said fourth rectifier means being connected to the other terminal of said first capacitor, the first electrode of said second rectifier means being connected to said second terminal, the second electrode of said second rectifier means being connected to the first main electrode of said first thyristor, the connection between the other terminal of said first capacitor and said first terminal being effected through said third rectifier means whose second electrode is connected to said other terminal of the said first capacitor and through said second thyristor whose first main electrode is connected to said other terminal of said first capacitor, the second main electrode of said second thyristor being connected to said first terminal, the first electrode of the said third rectifier means being connected to said first terminal; and means connected to the auxiliary electrodes and the cathodes of said first and second thyristors for controlling the conduction of said thyristors.

3. A supply system according to claim 2 wherein said unidirectional-voltage source comprises a transformer, the ends of the primary winding of which are adapted to be connected through said first switch to means for supplying an alternating voltage; a rectifying device of the voltage doubler type and including at least a third capacitor; means connecting the output of the secondary winding of said transformer to said rectifying device; a non-capacitive impedance; and means connecting the output of said rectifying device to said first and second terminals through said non-capacitive impedance, said internal impedance thereby consisting of said third capacitor and said non-capacitive impedance.

4. A supply system according to claim 3 wherein said electric energy storage member comprises a capacitor adapted to be discharged into an electronic flash device so as to illuminate an active material to obtain the laser effect.

* * * * *